US009896367B2

(12) United States Patent
Bisson et al.

(10) Patent No.: US 9,896,367 B2
(45) Date of Patent: Feb. 20, 2018

(54) METHODS AND APPARATUSES FOR PRODUCING LAMINATED GLASS SHEETS

(71) Applicant: CORNING INCORPORATED, Corning, NY (US)

(72) Inventors: Antoine Gaston Denis Bisson, Corning, NY (US); Olivier Fournel, Yerres (FR); Allen Mark Fredholm, Vulaines sur Seine (FR); Laurent Joubaud, Paris (FR); Jean-Pierre Henri René Lereboullet, Bois le Roi (FR); Xavier Tellier, Cheroy (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/252,745

(22) Filed: Aug. 31, 2016

(65) Prior Publication Data
US 2016/0368805 A1 Dec. 22, 2016

Related U.S. Application Data

(62) Division of application No. 14/413,625, filed as application No. PCT/IB2012/001715 on Jul. 13, 2012, now Pat. No. 9,458,044.

(51) Int. Cl.
*C03B 18/12* (2006.01)
*C03B 17/02* (2006.01)
*C03B 18/02* (2006.01)
*C03B 18/06* (2006.01)
*C03B 7/08* (2006.01)
*C03B 5/26* (2006.01)

(52) U.S. Cl.
CPC ............. *C03B 18/12* (2013.01); *C03B 5/267* (2013.01); *C03B 7/08* (2013.01); *C03B 17/02* (2013.01); *C03B 18/02* (2013.01); *C03B 18/06* (2013.01); *Y02P 40/57* (2015.11)

(58) Field of Classification Search
CPC ......... C03B 18/12; C03B 18/06; C03B 17/02; C03B 7/08; C03B 5/267
USPC ........................................................ 65/99.2
See application file for complete search history.

(56) References Cited

U.S. PATENT DOCUMENTS

| 3,509,011 A | 6/1957 | Pilkington |
| 3,673,049 A | 6/1972 | Giffen et al. |
| 3,737,294 A | 6/1973 | Dumbaugh et al. |
| 3,746,526 A | 7/1973 | Giffon |
| 3,847,585 A | 11/1974 | Chisholm |
| 3,849,097 A | 11/1974 | Giffen et al. |
| 3,931,438 A | 1/1976 | Beall et al. |
| 4,102,664 A | 7/1978 | Dumbaugh |
| 4,203,750 A | 5/1980 | Shay |
| 4,214,886 A | 7/1980 | Shay et al. |
| 4,457,771 A | 7/1984 | Ambrogi |
| 4,740,401 A | 4/1988 | Barkhan et al. |
| 5,342,426 A | 8/1994 | Dumbaugh |
| 5,406,641 A | 4/1995 | Bigley et al. |
| 5,485,541 A | 1/1996 | Bigley et al. |
| 5,559,060 A | 9/1996 | Dumbaugh et al. |
| 5,831,375 A | 11/1998 | Benson |
| 5,962,114 A | 10/1999 | Jonza et al. |
| 6,652,935 B1 | 11/2003 | Cirincione et al. |
| 7,201,965 B2 | 4/2007 | Gulati et al. |
| 7,514,149 B2 | 4/2009 | Bocko et al. |
| 7,685,841 B2 | 3/2010 | Boratav et al. |
| 7,718,266 B2 | 5/2010 | Kriltz et al. |
| 8,001,805 B2 | 8/2011 | Pitbladdo |
| 8,006,517 B2 | 8/2011 | Pitbladdo |
| 8,007,913 B2 | 8/2011 | Coppola et al. |
| 2003/0037569 A1 | 2/2003 | Arbab et al. |
| 2004/0197575 A1 | 10/2004 | Bocko et al. |
| 2007/0190340 A1 | 6/2007 | Coppola et al. |
| 2008/0311389 A1 | 12/2008 | Roquiny et al. |

FOREIGN PATENT DOCUMENTS

| EP | 0884283 A1 | 12/1998 |
| EP | 1857442 | 9/2002 |
| EP | 0884283 B1 | 1/2009 |
| GB | 722577 | 11/1953 |
| WO | 2012005941 | 1/2012 |

OTHER PUBLICATIONS

International Search Report, dated Jan. 27, 2014, International Application No. PCT/IB2012/001715, pp. 1-6, European Patent Office, The Netherlands.
Written Opinion of the International Searching Authority, dated Jan. 13, 2015, International Application No. PCT/IB2012/001715, pp. 1-10, European Patent Office, The Netherlands.
Notice of the First Office Action, dated Aug. 2, 2016, pp. 1-10, Chinese Application No. 201280074693.8, The State Intellectual Property Office of the People's Republic of China, China.

*Primary Examiner* — Mark Halpern
(74) *Attorney, Agent, or Firm* — Michael A. Hood

(57) ABSTRACT

According to one embodiment, a method for forming a laminated glass sheet includes forming a multi-layer glass melt from a molten core glass and at least one molten cladding glass. The multi-layer glass melt has a width $W_m$, a melt thickness $T_m$ and a core to cladding thickness ratio $T_c:T_{cl}$. The multi-layer glass melt is directed onto the surface of a molten metal bath contained in a float tank. The width $W_m$ of the multi-layer glass melt is less than the width $W_f$ of the float tank prior to the multi-layer glass melt entering the float tank. The multi-layer glass melt flows over the surface of the molten metal bath such that the width $W_m$ of the multi-layer glass melt increases, the melt thickness $T_m$ decreases, and the core to cladding thickness ratio $T_c:T_{cl}$ remains constant as the multi-layer glass melt solidifies into a laminated glass sheet.

15 Claims, 5 Drawing Sheets

METHODS AND APPARATUSES FOR PRODUCING LAMINATED GLASS SHEETS

This application is a divisional of U.S. application Ser. No. 14/413,625 filed on Jan. 8, 2015, which claims the benefit of priority under 35 U.S.C. § 371 of International Application Number PCT/IB2012/001715 filed on Jul. 13, 2012, the content of each of which is relied upon and incorporated herein by reference in its entirety.

BACKGROUND

Field

The present specification generally relates to laminated glass sheets and, more specifically, to methods and apparatuses for producing laminated glass sheets by float processes.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. The glass articles incorporated in these devices may be susceptible to damage during transport and/or use of the associated device. Accordingly, glass articles used in such devices may require enhanced strength to be able to withstand not only routine "touch" contact from actual use, but also incidental contact and impacts.

Various processes may be used to strengthen glass articles, including chemical tempering and thermal tempering. Chemical and thermal tempering processes may be used to strengthen a glass article after the article is formed, thereby requiring additional processing steps and handling of the glass article, both of which may result in damage to the glass article which increases production costs and decreases productivity, particularly for larger glass articles.

Accordingly, a need exists for alternative methods and apparatuses for forming strengthened glass sheets.

SUMMARY

According to one set of embodiments, a method for forming a laminated glass sheet may include forming a multi-layer glass melt from a molten core glass and at least one molten cladding glass. The multi-layer glass melt may have a width $W_m$, a melt thickness $T_m$ and a core to cladding thickness ratio $T_c:T_{cl}$. The multi-layer glass melt may be directed onto the surface of a molten metal bath contained in a float tank having a width $W_f$. The width $W_m$ of the multi-layer glass melt is less than the width $W_f$ of the float tank prior to the multi-layer glass melt entering the float tank. The multi-layer glass melt may flow over the surface of the molten metal bath such that the width $W_m$ of the multi-layer glass melt increases, the melt thickness $T_m$ decreases, and the core to cladding thickness ratio $T_c:T_{cl}$ remains constant as the multi-layer glass melt solidifies into a laminated glass sheet.

In another set of embodiments, a method for forming a laminated glass sheet may include forming a molten core glass from a core glass composition and forming a molten cladding glass from a cladding glass composition. A slot draw apparatus comprising a core glass slot and at least one cladding glass slot may be provided. The core glass slot and the at least one cladding glass slot may be oriented in parallel with one another. The slot draw apparatus may be positioned over a float tank containing a molten metal bath and oriented at a slot angle greater than or equal to 0° and less than 90° with respect to a surface of the molten metal bath. A width $W_s$ of the slot draw apparatus may be less than a width $W_f$ of the float tank. The molten core glass and the molten cladding glass may be delivered to the slot draw apparatus such that the molten core glass passes through the core glass slot and the molten cladding glass passes through the at least one cladding glass slot. The molten cladding glass and the molten core glass may form a multi-layer glass melt with a width $W_m$, a melt thickness $T_m$, and a core to cladding thickness ratio $T_c:T_{cl}$ upon exiting the slot draw apparatus. The width $W_m$ of the multi-layer glass melt is less than the width $W_f$ of the float tank. The multi-layer glass melt may be directed onto the surface of the molten metal bath. As the multi-layer glass melt flows over the surface of the molten metal bath, the width $W_m$ of the multi-layer glass melt increases, the melt thickness $T_m$ decreases, and the core to cladding thickness ratio $T_c:T_{cl}$ remains constant as the multi-layer glass melt solidifies into a laminated glass sheet.

In yet another set of embodiments, an apparatus for forming a laminated glass sheet may include a core glass melting vessel, a cladding glass melting vessel and a slot draw apparatus comprising a core glass slot and at least one cladding glass slot. The core glass slot and the at least one cladding glass slot may be oriented in parallel with one another. The core glass slot may be fluidly coupled to the core glass melting vessel such that molten core glass can be delivered from the core glass melting vessel to the core glass slot. The at least one cladding glass slot may be fluidly coupled to the cladding glass melting vessel such that molten cladding glass can be delivered from the cladding glass melting vessel to the at least one cladding glass slot. The apparatus may further include a float tank containing a molten metal bath. The float tank may have a width $W_f$ which is greater than a width $W_s$ of the slot draw apparatus. The slot draw apparatus may be positioned over the float tank and oriented at a slot angle greater than or equal to 0° and less than 90° with respect to a surface of the molten metal bath.

Additional features and advantages of the methods and apparatuses for forming laminated glass sheets will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
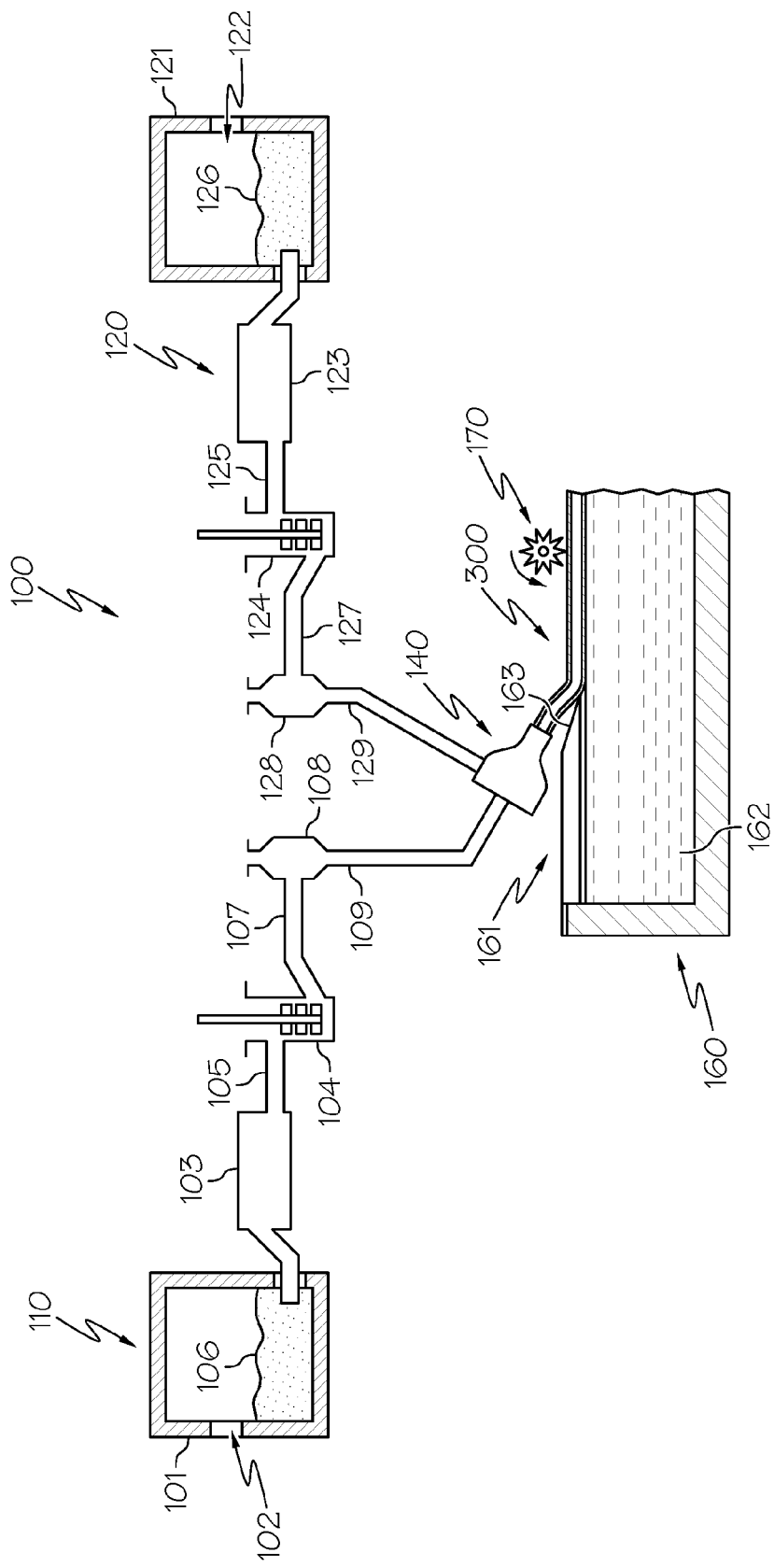
FIG. 1A schematically depicts an exemplary glass manufacturing apparatus for forming laminated glass sheets, according to one or more embodiments shown and described herein.
Figure 1B:
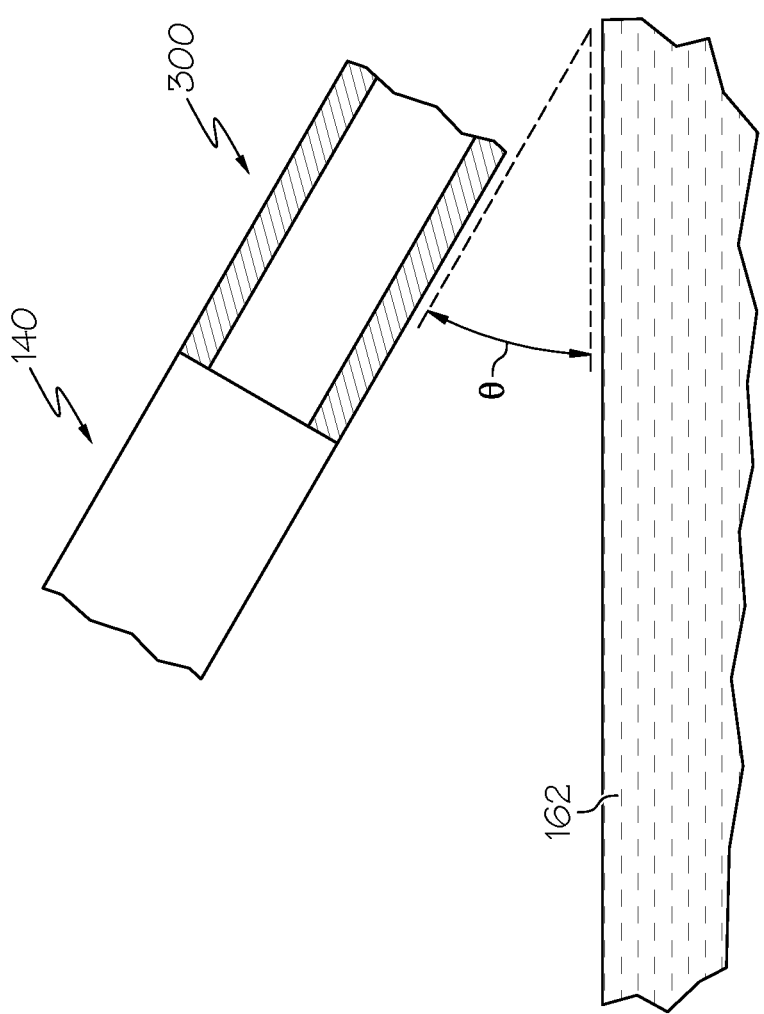
FIG. 1B schematically depicts a portion of the glass manufacturing apparatus of FIG. 1A.

Reference will now be made in detail to methods and apparatuses for forming laminated glass sheets, embodiments of which are schematically depicted in the accompanying drawings. Whenever possible, the same reference numerals are used throughout the drawings to refer to the same or like parts. One embodiment of a method for forming a laminated glass sheet is schematically depicted in FIG. 1A. The method generally includes forming a multi-layer glass melt from a molten core glass and at least one molten cladding glass. The multi-layer glass melt may have a width $W_m$, a melt thickness $T_m$ and a core to cladding thickness ratio $T_c:T_{cl}$. The multi-layer glass melt may be directed onto the surface of a molten metal bath contained in a float tank having a width $W_f$. The width $W_m$ of the multi-layer glass melt is less than the width $W_f$ of the float tank prior to the multi-layer glass melt entering the float tank. The multi-layer glass melt may flow over the surface of the molten metal bath such that the width $W_m$ of the multi-layer glass melt increases, the melt thickness $T_m$ decreases, and the core to cladding thickness ratio $T_c:T_{cl}$ remains constant as the multi-layer glass melt solidifies into a laminated glass sheet. Various embodiments of methods for forming laminated glass sheets and apparatuses for performing the method will be described in more detail herein with specific reference to the appended drawings.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

Strengthened laminated glass articles may be formed by fusing one or more glass cladding layers having a relatively low average coefficient of thermal expansion to a glass core layer which has a relatively high average coefficient of thermal expansion. As the laminated structure cools, the differences in the coefficients of thermal expansion of the glass core layer and the glass cladding layer create compressive stresses in the glass cladding layers.

Laminated glass sheets have been formed by a fusion lamination process, such as the fusion lamination process disclosed in U.S. Pat. No. 4,214,886 and similar fusion lamination processes. Glass compositions used in conjunction with fusion lamination processes generally have a high liquidus viscosity of greater than 100 kpoise such that the glass is able to be drawn vertically downward at elevated temperatures. In comparison, glasses with lower viscosities tend to "run" at the temperature of the fusion lamination process making it difficult to draw such glass compositions at elevated temperatures. Further, it has been found that reducing the temperature of the fusion lamination process to accommodate glasses with lower viscosities (i.e., increasing the viscosity of the glass by lowering the processing temperatures) may increase the number of defects in the glass as the lower temperatures encourage the nucleation and growth of crystals on the ceramic forming equipment of the fusion apparatus which can become dislodged and embedded in the glass. In addition, the shear mass of the fusion forming equipment, such as the isopipe, used in fusion forming processes makes it difficult to scale the processes to form large-width glass sheets. The methods and apparatuses described herein enable the formation of laminated glass sheets from glass compositions with low liquidus viscosities and also enable the formation of large-width laminated glass sheets.

Referring now to FIG. 1A, an exemplary glass manufacturing apparatus 100 for forming laminated glass sheets from molten glass is schematically depicted. The glass manufacturing apparatus generally comprises a core glass delivery system 110, a cladding glass delivery system 120, a slot draw apparatus 140, and a float tank 160. The float tank contains a molten metal bath 162, such as molten tin or the like.

The core glass delivery system 110 generally includes a core melting vessel 101, a core fining vessel 103, a core mixing vessel 104, a core delivery vessel 108, and a core feed pipe 109 coupled to a core slot of the slot draw apparatus 140. The cladding glass delivery system 120 generally includes a cladding melting vessel 121, a cladding fining vessel 123, a cladding mixing vessel 124, a cladding delivery vessel 128, and a cladding feed pipe 129 coupled to at least one cladding slot of the slot draw apparatus 140.

The float tank 160 is generally positioned below the core glass delivery system 110 and the cladding glass delivery system 120 such that molten core glass 106 and molten cladding glass 126 can be delivered to the float tank by gravity. In the embodiment of the float tank 160 depicted in FIG. 1A, the float tank 160 includes a receiving plane 161 suspended over the surface of the molten metal bath 162. The receiving plane 161 includes a receiving surface 163 for receiving a multi-layer glass melt 300 discharged from the slot draw apparatus 140. The receiving surface 163 is positioned at an angle with respect to the surface of the molten metal bath 162 such that the multi-layer glass melt discharged from the slot draw apparatus 140 flows over the receiving surface 163 and onto the surface of the molten metal bath 162 in a controlled manner.

While the float tank 160 of FIG. 1A is depicted with a receiving plane 161 having a receiving surface 163, it should be understood that, in other embodiments (not shown), the float tank 160 may be constructed without a receiving plane 161. In these embodiments, the multi-layer glass melt discharged from the slot draw apparatus 140 may be deposited directly on the surface of the molten metal bath 162.

Figure 2:
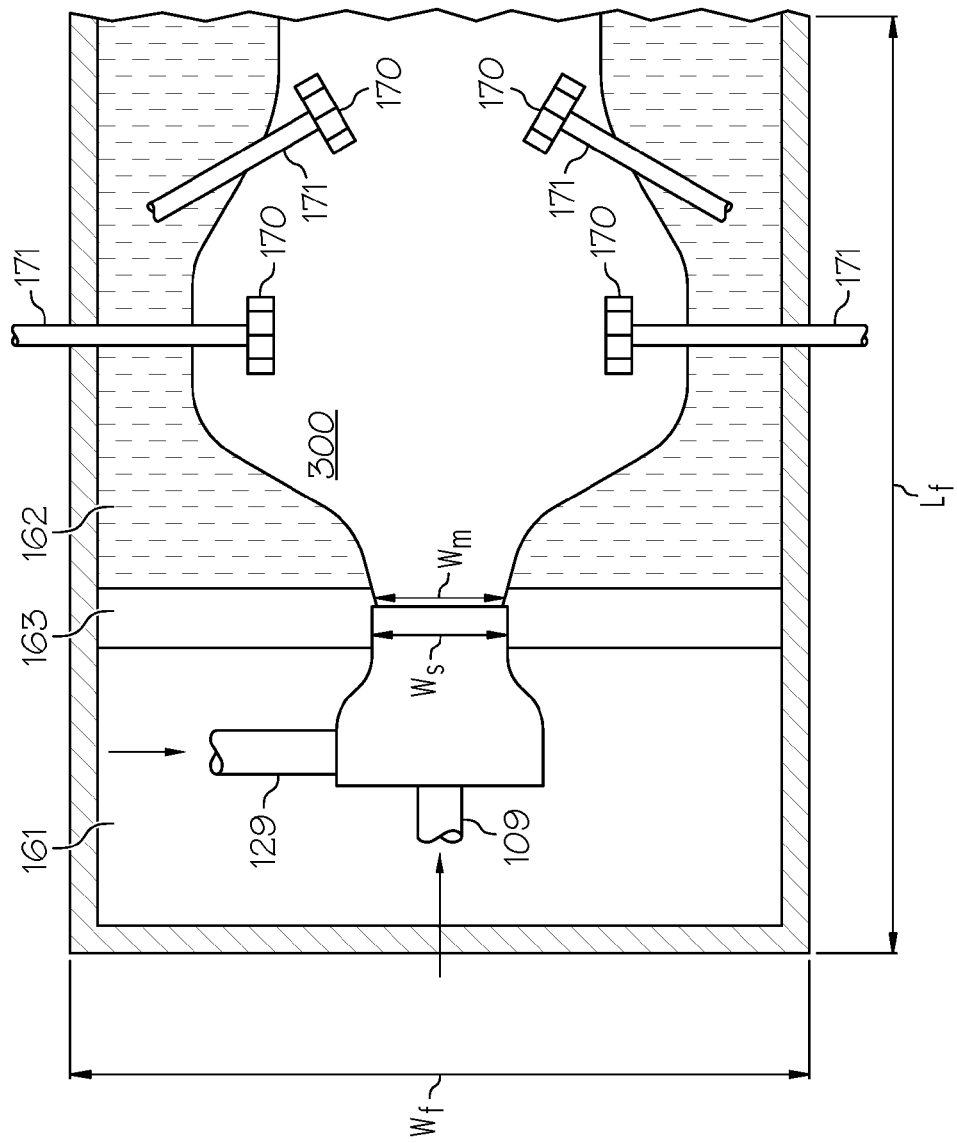
FIG. 2 schematically depicts a top view of the glass manufacturing apparatus of FIG. 1A.

Referring to FIGS. 1A and 2, in some embodiments, the float tank 160 may also include one or more top rolls 170 (one depicted in FIG. 1A) for contacting the multi-layer glass melt 180 as it flows over the surface of the molten metal bath 162. The top rolls 170 are each coupled to a rotating shaft 171 such that, as the top rolls rotate, the multi-layer glass melt is drawn in a direction of the width $W_f$ of the float tank 160 and/or a length $L_f$ of the float tank 160 to encourage the glass melt to spread over the surface of the molten metal bath 162.

Referring to FIGS. 1A-1B and 3-4, the slot draw apparatus 140 is disposed over the float tank 160 and oriented such that a slot angle θ between the slot draw apparatus 140 and the surface of the molten metal bath 162 is greater than or equal to 0° and less than 90°. The slot draw apparatus is formed from a precious metal, such as platinum, platinum alloys or other precious metals suitable for use at the elevated temperatures of a glass forming process. The slot draw apparatus 140 generally comprises a core slot 142 and at least one cladding slot which is substantially parallel with the core slot 142. The width $W_s$ of the slot draw apparatus 144 (i.e., the width of the core slot 142 and the width of the cladding slot(s) 144) is less than the width of the float tank 160 (see, e.g., FIG. 2).

In the embodiment of the slot draw apparatus 140 shown in FIGS. 1A-1B and 3-4, the slot draw apparatus is constructed with a first cladding slot 144a positioned over the core slot 142 and a second cladding slot 144b positioned beneath the core slot 142. In this embodiment, the slot draw apparatus 140 may be used to produce a multi-layer glass melt with a central core disposed between two cladding layers. However, it should be understood that the slot draw apparatus 140 may be constructed with a single cladding slot positioned either over the core slot 142 or below the core slot 142, such as when the slot draw apparatus is 140 is used to form a multi-layer glass melt with a single core layer and a single cladding layer. Further, it should also be understood that the slot draw apparatus may be formed with greater than three slots, such as when the slot draw apparatus is used to form a multi-layer glass melt with more than three layers.

Figure 3:
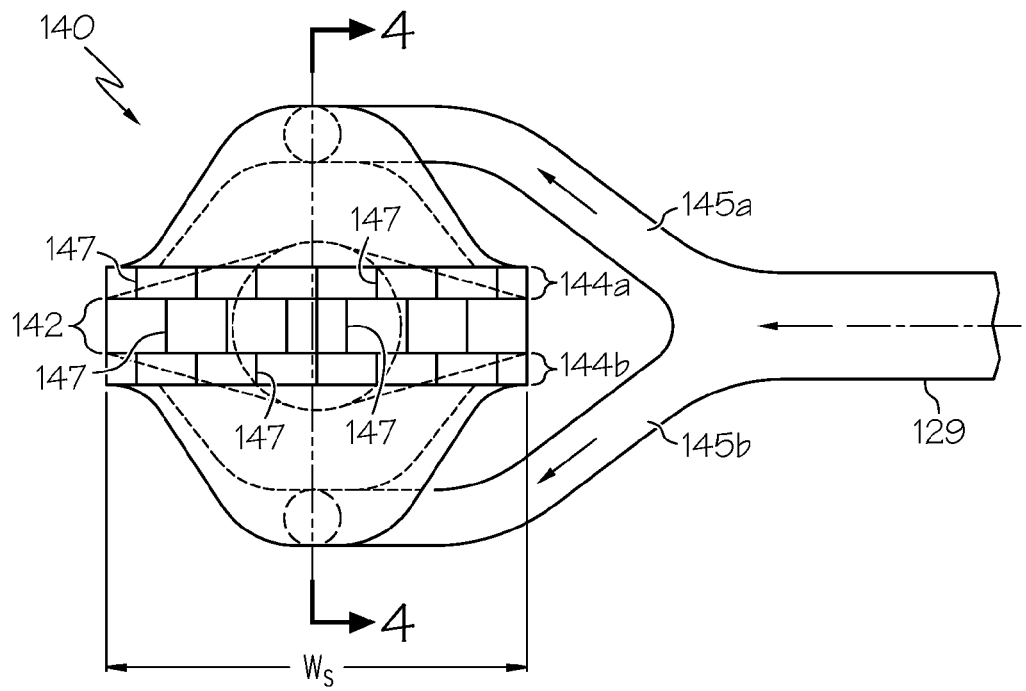
FIG. 3 schematically depicts a front view of a slot draw apparatus for forming a multi-layer glass melt.
Figure 4:
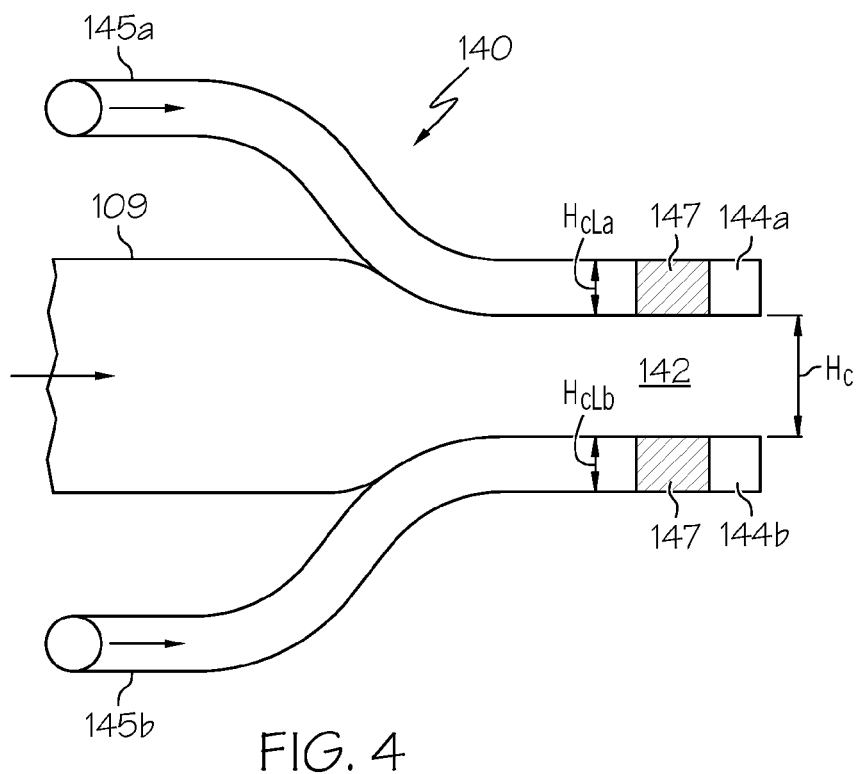
FIG. 4 schematically depicts a cross section of the slot draw apparatus of FIG. 3.

The core slot 142 of the slot draw apparatus 140 has a core height $H_c$ and the at least one cladding slot has a height $H_{cl}$. In embodiments where the slot draw apparatus contains a first cladding slot 144a and a second cladding slot 144b, as depicted in FIGS. 3 and 4, the first cladding slot may have a height $H_{cla}$ and the second cladding slot may have a height $H_{clb}$. In some embodiments, the height $H_c$ of the core slot may be equal to the height of each of the cladding slots. In other embodiments, the height $H_c$ of the core slot may be different than the height of the cladding slots. In still other embodiments, the height $H_{cla}$ of the first cladding slot 144a may be different than the height $H_{clb}$ of the second cladding slot.

In the embodiment of the slot draw apparatus 140 shown in FIGS. 3-4, the core feed pipe 109 is coupled to the core slot 142 of the slot draw apparatus 140, as depicted in FIG. 4, such that molten core glass delivered to the slot draw apparatus 140 with the core feed pipe 109 flows through the core slot 142. The cladding feed pipe 129 is coupled to the first cladding slot 144a and the second cladding slot 144b with feed plenums 145a, 145b, respectively. Accordingly, the molten cladding glass delivered to the slot draw apparatus 140 through the cladding feed pipe 129 flows through the plenums 145a, 145b and through the first cladding slot 144a and the second cladding slot 144b, respectively.

In general, the pressure drop of the molten glass flowing through the slots is greater than the pressure drop of the molten glass in the respective feed pipes. For example, in some embodiments, the pressure drop of the molten glass through the slot draw apparatus is at least 10× greater than the pressure drop of the molten glass in the corresponding feed pipe. This pressure drop in the slot draw apparatus 140 encourages the molten glass to fill each of the slots across the entire width $W_s$ of the slot draw apparatus 140 thereby promoting uniformity in the multi-layer glass melt formed by the slot draw apparatus.

Despite being formed from metals and/or alloys suitable for use at high temperatures, the dimensions of the slot draw apparatus 140 may change over time due to elevated temperature exposure. In order to minimize distortions in the resultant multi-layer glass melt, the core slot 142 and the cladding slots 144a, 144b of the slot draw apparatus may include a plurality of reinforcing webs 147 positioned in each of the slots, as depicted in FIGS. 3-4. The reinforcing webs improve the mechanical rigidity of the slot draw apparatus and also minimize dimensional changes in the slot draw apparatus due to prolonged elevated temperature exposure.

In some embodiments of the slot draw apparatus 140, the reinforcing webs 147 are recessed from the slot openings, as depicted in FIG. 4. This configuration allows the molten glass to flow around the webs and re-knit into a continuous mass prior to exiting each of the slots. The process of re-knitting the glass web generally occurs between the end of the reinforcing webs 147 and the exit of the slot draw apparatus 140 and is assisted by the pressure drop in this portion of the slot draw apparatus as well as the surface tension of the molten glass. The re-knitting process may be further assisted by the specific geometry of the webs as well as gravity as the molten glass exits the slot draw apparatus and is deposited in the molten metal bath. However, in other embodiments (not shown), the reinforcing webs 147 may extend to the slot opening.

While FIGS. 3-4 schematically depicts a slot draw apparatus 140 which includes reinforcing webs 147 in each of the slots, it should be understood that the reinforcing webs are optional and that, in some embodiments, the slot draw apparatus 140 may be formed without reinforcing webs.

Referring again to FIGS. 1A and 2, in operation, core glass batch materials are introduced into the core melting vessel 101 as indicated by arrow 102. The core glass batch materials are melted in the core melting vessel 101 to form molten core glass 106. The molten core glass 106 flows into the core fining vessel 103 which has a high temperature processing area that receives the molten core glass 106 from the core melting vessel 101. The core fining vessel 103 removes bubbles from the molten core glass 106. The core fining vessel 103 is fluidly coupled to the core mixing vessel 104 by a connecting tube 105. That is, molten glass flowing from the core fining vessel 103 to the core mixing vessel 104 flows through the core connecting tube 105. The core mixing vessel 104 is, in turn, fluidly coupled to the core delivery vessel 108 by a connecting tube 107 such that molten glass flowing from the core mixing vessel 104 to the core delivery vessel 108 flows through the connecting tube 107. The core delivery vessel 108 supplies the molten core glass 106 to the core slot of the slot draw apparatus 140.

Simultaneously, cladding glass batch materials are introduced into the cladding melting vessel 121 as indicated by arrow 122. The cladding glass batch materials are melted in the cladding melting vessel 121 to form molten cladding glass 126. The cladding fining vessel 123 has a high temperature processing area that receives the molten cladding glass 126 from the cladding melting vessel 121. The cladding fining vessel 123 removes bubbles from the molten cladding glass 126. The cladding fining vessel 123 is fluidly coupled to the cladding mixing vessel 124 by a connecting tube 125. That is, molten cladding glass flowing from the cladding fining vessel 123 to the cladding mixing vessel 124 flows through the cladding connecting tube 125. The cladding mixing vessel 124 is, in turn, fluidly coupled to the cladding delivery vessel 128 by a connecting tube 127 such that molten glass flowing from the cladding mixing vessel 124 to the cladding delivery vessel 128 flows through the connecting tube 127. The cladding delivery vessel 128 supplies the molten cladding glass 126 to at least one cladding slot of the slot draw apparatus 140.

Figure 5:
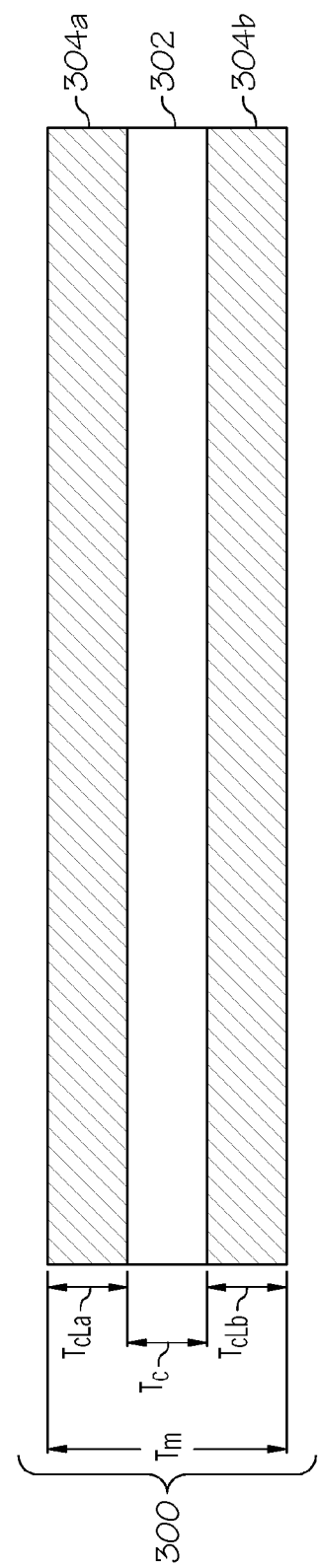
FIG. 5 schematically depicts a cross section of a multi-layer glass melt according to one or more embodiments shown and described herein.

The molten core glass and the molten cladding glass flow through the slot draw apparatus 140 in the respective core and cladding slots. The relative orientation of the slots in the slot draw apparatus 140 causes the molten core glass and the molten cladding glass to be layered together upon exiting the slot draw apparatus 140, thereby forming a multi-layer glass melt 300, such as the multi-layer glass melt 300 depicted in cross section in FIG. 5. The multi-layer glass melt 300 discharged from the slot draw apparatus has a melt thickness $T_m$ and includes a core layer 302 disposed between a first cladding layer 304a and a second cladding layer 304b. The core layer 302 has a thickness $T_c$, the first cladding layer 304a has a thickness $T_{cla}$ and the second cladding layer 304b has a thickness $T_{clb}$. The thickness of each of these layers is generally proportional to the cube of the height of the corresponding slot (i.e., the core layer 302 has a thickness $T_c \approx H_c^3$, the first cladding layer 304a has a thickness $T_{cla} \approx H_{cla}^3$, and the second cladding layer 304b has a thickness $T_{clb} \approx H_{clb}^3$). Further, the multi-layer glass melt 300 has a core to cladding thickness ratio $T_c:T_{cl}$ where $T_c$ is the thickness of the core layer 302 and $T_{cl}$ is the sum of the thicknesses of the cladding layers 304a, 304b. Accordingly, in embodiments in which two cladding slots are disposed on either side of a core slot, the core to cladding thickness ratio Tc:Tcl of the multi-layer glass melt 300 can be approximated by the equation $H_c^3/(H_{cla}^3+H_{clb}^3)$. The width $W_m$ of the multi-layer glass melt 300 is generally the same as the width $W_s$ of the slot draw apparatus 140 as the core layer 302 and the cladding layers 304a, 304b are discharged from the slot draw apparatus. Accordingly, it should be understood that the width $W_m$ of the multi-layer glass melt 300 is generally less than the width of the float tank $W_f$ prior to the multi-layer glass melt 300 entering the float tank 160.

In the embodiment of the glass manufacturing apparatus 100 depicted in FIG. 1A, the slot draw apparatus 140 is oriented at a slot angle greater than or equal to about 0 degrees and less than 90 degrees relative to the surface of the molten metal bath to facilitate depositing the multi-layer glass melt 300 onto the surface of the molten metal bath 162 while still maintaining the orientation and integrity of the layered structure imparted to the multi-layer glass melt 300 by the slot draw apparatus 140. Further, the non-perpendicular orientation of the slot draw apparatus 140 with respect to the surface of the molten metal bath encourages the multi-layer glass melt 300 to flow over the surface of the molten metal bath 162 in a direction away from the slot draw apparatus 140.

As noted above, the embodiment of the float tank 160 depicted in FIG. 1A includes a receiving plane 161 suspended over the surface of the molten metal bath 162. The receiving plane 161 includes a receiving surface 163 which is angled downward, into the molten metal bath 162. In this embodiment, the multi-layer glass melt 300 discharged from the slot is deposited on to the receiving surface 163 of the receiving plane 161 in order to introduce the multi-layer glass melt 300 into the molten metal bath 162 in a controlled manner. Specifically, the multi-layer glass melt 300 is discharged from the slot draw apparatus 140 onto the receiving surface 163 such that the multi-layer glass melt 300 flows over the receiving surface 163 and onto the surface of the molten metal bath 162, thereby maintaining the orientation and integrity of the individual layers of the multi-layer glass melt 300.

While FIG. 1A depicts the multi-layer glass melt 300 as being deposited on the receiving surface 163 of the receiving plane 161 before entering the molten metal bath 162, it should be understood that this step is optional. For example, in some embodiments (not shown) the multi-layer glass melt 300 may be deposited directly into the molten metal bath 162 without first being deposited onto the receiving surface 163 of a receiving plane 161 suspended over the molten metal bath 162.

Stiller referring to FIGS. 1A and 2, upon being deposited on the molten metal bath 162, the multi-layer glass melt 300 flows over the surface of the molten metal bath 162. As the multi-layer glass melt flows over the surface of the molten metal bath 162, the multi-layer glass melt 300 spreads over the surface of the molten metal bath 162 in the direction of both the length $L_f$ and width $W_f$ of the float tank 160 such that the width $W_m$ of the multi-layer glass melt 300 increases and the thickness $T_m$ of the multi-layer glass melt 300 decreases as the multi-layer glass melt reaches both an equilibrium width and an equilibrium thickness on the surface of the molten metal bath 162. However, while the melt thickness $T_m$ of the multi-layer glass melt 300 decreases and the width $W_m$ of the multi-layer glass melt increases, the core to cladding thickness ratio $T_c:T_{cl}$ remains constant as the multi-layer glass melt solidifies into a laminated glass sheet.

As noted hereinabove, the glass manufacturing apparatus 100 may include one or more top rolls 170 which may be used to contact the multi-layer glass melt 300 and draw the multi-layer glass melt 300 over the surface of the molten metal bath 162, thinning the multi-layer glass melt 300 and, optionally, increasing the width $W_m$ of the multi-layer glass melt 300. Accordingly, in some embodiments, the top rolls 170 may be used to draw the multi-layer glass melt 300 in a direction of the width $W_f$ of the float tank as the multi-layer glass melt flows over the surface of the molten metal bath. In some other embodiments, the top rolls 170 may be used to draw the multi-layer glass melt 300 in a direction of the width $W_f$ of the float tank and in a direction of the length $L_f$ of the float tank as the multi-layer glass melt 300 flows over the surface of the molten metal bath 162.

As the multi-layer glass melt flows and/or is drawn over the surface of the molten metal bath 162, the multi-layer glass melt 300 gradually cools and solidifies, forming a laminated glass sheet. In some embodiments described herein, the cladding glass has a first glass composition which has an average cladding coefficient of thermal expansion $CTE_{clad}$ and the core glass is formed from a second, different glass composition which has an average coefficient of thermal expansion $CTE_{core}$. In these embodiments, the $CTE_{core}$ may be greater than the $CTE_{clad}$ such that, when the multi-layer glass melt 300 solidifies, the difference in the coefficients of thermal expansion results in the cladding glass being compressively stressed thereby increasing the mechanical strength of the laminated glass sheet without the glass sheet being ion exchanged or thermally tempered.

The methods and apparatuses described herein may be used to produce laminated glass sheets of varying thicknesses and widths. In particular, the methods and apparatuses described herein may be scaled to produce laminated glass sheets having widths on the order of several meters. For example, in some embodiments, the width of the resultant glass sheet may be greater than 1 meter or even greater than 3 meters. In some embodiments, the width of the resultant glass sheet may be greater than 4 meters or even greater than 5 meters.

Further, the thicknesses of the resultant laminated glass sheets may be less than 1 cm. For example, in some embodiments, the thickness of the resultant laminated glass sheet may be less than or equal to 7 mm or even less than or equal to 5 mm. In some embodiments, the thickness of the resultant laminated glass sheet may be less than or equal to 2.5 mm. In still other embodiments the thickness of the resultant laminated glass sheet may be less than or equal to 1 mm.

Further, the methods and apparatuses described herein may also be used to form laminated glass sheets with different structures. For example, any number of cladding slots may be added on either side of the core slot in order to produce a laminated glass sheet having the desired structure. The methods and apparatuses described herein may be used to produce laminated glass sheets with symmetrical claddings (i.e., the same number of cladding layers on either side of the glass core) or asymmetrical claddings (i.e., a different number of cladding layers on either side of the glass core). Further, the methods and apparatuses described herein may also be used to produce laminated glass sheets wherein the thicknesses of the cladding layers are symmetrical or asymmetrical about the glass core.

While the methods and apparatuses described herein are compatible with glass compositions of varying liquidus viscosities, the methods and apparatuses described herein are particularly well suited for use with core glass compositions and cladding glass compositions which have lower liquidus viscosities which are not generally suitable for use with fusion forming processes such as fusion lamination processes. For example, in the embodiments described herein, the core glass compositions and the cladding glass compositions may have liquidus viscosities less than 100 kpoise. In some embodiments, the core glass compositions and the cladding glass compositions may have liquidus viscosities less than or equal to 100 kpoise, or even less than or equal to 50 kpoise. In some embodiments, the core glass compositions and the cladding glass compositions may have liquidus viscosities less than or equal to 30 kpoise or even less than or equal to 20 kpoise.

EXAMPLES

The methods and apparatuses will be further clarified by the following hypothetical example.

Example 1

While not wishing to be bound by theory, it is believed that the methods and apparatuses described herein may be used to form laminated glass sheets as exemplified by the following hypothetical example. The hypothetical slot draw apparatus has a core slot disposed between a first cladding slot and a second cladding slot. The core slot had a height $H_c$ of 0.0125 m. The cladding slots each had a height $H_{cla} = H_{clb} = 0.006$ m. The hypothetical slot draw apparatus had a width $W_s$ of 0.4 m. Based on the foregoing, the core to cladding ratio $T_c:T_{cl}$ of the glass melt discharged from the slot draw apparatus is 4.5. In this hypothetical, the slot draw apparatus may be coupled to a core glass delivery system and a cladding glass delivery system which, combined, are capable of delivering 37 metric tons of glass per day to the slot draw apparatus. The core glass and the cladding glass compositions hypothetically have identical viscosities and the temperature of the glass manufacturing system is maintained at a temperature such that both the core glass and the cladding glass have viscosities of 2000 poise. It is believed that the glass manufacturing system of this hypothetical example is suitable for forming a glass sheet having a width of 4 m or greater.

It should now be understood that the methods and apparatuses described herein may be utilized to produce laminate glass sheets from core and cladding glass compositions having a broad range of liquidus viscosities, including liquidus viscosities of less than 100 kpoise or even less than 20 kpoise. Further, the methods and apparatuses described herein may be scaled to produce glass sheets having widths on the order of several meters, including, without limitation, glass sheets with widths greater than about 4 meters.

Further, the methods and apparatuses described herein may be utilized during formation of the glass sheet to produce a strengthened laminated glass sheet and, as such, the need for secondary processing steps may be eliminated. Accordingly, the risk of damaging the glass sheet as the glass sheet is transferred to different processing areas may also be eliminated thereby decreasing production losses and production costs.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a laminated glass sheet, the method comprising:
   delivering a molten core glass and a molten cladding glass to a slot draw apparatus such that the molten core glass passes through a core slot of the slot draw apparatus and the molten cladding glass passes through at least one cladding slot of the slot draw apparatus to form a multi-layer glass melt with a width $W_m$, a melt thickness $T_m$, and a core to cladding thickness ratio $T_c:T_{cl}$ upon exiting the slot draw apparatus;
   directing the multi-layer glass melt onto a surface of a molten metal bath with a width $W_f$ that is greater than the width $W_m$ such that, as the multi-layer glass melt flows over the surface of the molten metal bath, the width $W_m$ of the multi-layer glass melt increases, the melt thickness $T_m$ decreases, and the core to cladding thickness ratio $T_c:T_{cl}$ remains constant as the multi-layer glass melt solidifies into the laminated glass sheet.

2. The method of claim 1, further comprising directing the multi-layer glass melt onto a receiving surface of a receiving plane prior to directing the multi-layer glass melt onto the surface of the molten metal bath.

3. The method of claim 2, wherein the receiving surface of the receiving plane is oriented at a receiving plane angle greater than or equal to 0° and less than 90° with respect to the surface of the molten metal bath.

4. The method of claim 1, further comprising:
   contacting an upper surface of the multi-layer glass melt with a plurality of top rollers when the multi-layer glass melt is on the surface of the molten metal bath; and
   drawing the multi-layer glass melt in a direction of the width $W_f$ of the molten metal bath with the plurality of top rollers.

5. The method of claim 1, further comprising:
   contacting an upper surface of the multi-layer glass melt with a plurality of top rollers when the multi-layer glass melt is on the surface of the molten metal bath; and
   drawing the multi-layer glass melt in a direction of the width $W_f$ and a length $L_f$ of the molten metal bath with the plurality of top rollers.

6. The method of claim 1, wherein the core slot has a core height $H_c$, the at least one cladding slot has a cladding height $H_{cl}$ and the core height $H_c$ is not equal to the cladding height $H_{cl}$.

7. The method of claim 1, wherein the at least one cladding slot comprises a first cladding slot and a second cladding slot and the core slot is positioned between the first cladding slot and the second cladding slot.

8. The method of claim 7, wherein the first cladding slot has a first height $H_{cla}$, the second cladding slot has a second height $H_{clb}$, and the first height $H_{cla}$ is not equal to the second height $H_{clb}$.

9. The method of claim 7, wherein the core slot has a core height $H_c$, the first cladding slot has a first height $H_{cla}$, the second cladding slot has a second height $H_{clb}$, and the core height $H_c$ is greater than each of the first height $H_{cla}$ and the second height $H_{clb}$.

10. The method of claim 1, wherein the core slot and the at least one cladding slot comprise a plurality of reinforcing webs.

11. The method of claim 10, wherein the reinforcing webs are recessed from an outlet of the slot draw apparatus.

12. The method of claim 1, wherein the core slot and the at least one cladding slot are oriented in parallel with one another.

13. The method of claim 1, wherein the slot draw apparatus is oriented at a slot angle greater than or equal to 0° and less than 90° with respect to the surface of the molten metal bath.

14. The method of claim 1, wherein a width $W_s$ of the slot draw apparatus is less than the width $W_f$ of the molten metal bath.

15. The method of claim 1 wherein the laminated glass sheet has a width greater than 4 meters.

* * * * *